US006544463B1

(12) United States Patent
Luzzi et al.

(10) Patent No.: US 6,544,463 B1
(45) Date of Patent: Apr. 8, 2003

(54) HYBRID MATERIALS AND METHODS FOR PRODUCING THE SAME

(75) Inventors: David E. Luzzi, Wallingford, PA (US); Brian W. Smith, Schelton, CT (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 125 days.

(21) Appl. No.: 09/625,946

(22) Filed: Jul. 26, 2000

Related U.S. Application Data

(60) Provisional application No. 60/145,586, filed on Jul. 26, 1999.

(51) Int. Cl.$^7$ .............................. B29C 71/02; B82B 3/00
(52) U.S. Cl. ....................................................... 264/346
(58) Field of Search ................................ 264/101, 232, 264/235, 340, 346

(56) References Cited

U.S. PATENT DOCUMENTS

| | | | |
|---|---|---|---|
| 4,663,230 A | 5/1987 | Tennent | 428/367 |
| 5,346,683 A | 9/1994 | Green et al. | 423/447 |
| 5,424,054 A | 6/1995 | Bethune et al. | 423/447.2 |
| 5,457,343 A | 10/1995 | Ajayan et al. | 257/14 |
| 5,543,378 A | 8/1996 | Wang | 502/174 |
| 5,547,748 A | 8/1996 | Ruoff et al. | 428/323 |
| 5,580,612 A | 12/1996 | Hickel et al. | 427/430.1 |
| 6,129,901 A | * 10/2000 | Moskovits et al. | 423/447.3 |
| 6,139,919 A | * 10/2000 | Eklund et al. | 427/430.1 |
| 6,277,318 B1 | * 8/2001 | Bower et al. | 264/346 |
| 2002/0027819 A1 | 3/2002 | Tomanek et al. | 365/215 |

FOREIGN PATENT DOCUMENTS

| | | |
|---|---|---|
| WO | WO 02/24572 A1 | 3/2002 |
| WO | WO 02/24573 A1 | 3/2002 |
| WO | WO 02/24574 A1 | 3/2002 |
| WO | WO 02/30816 A1 | 4/2002 |

OTHER PUBLICATIONS

Young–Kyun Kwon, et al., "Bucky Shuttle" Memory Device: Synthetic Approach and Molecular Dynamics Simulations, *Physical Review Letters: The American Physical Society*, 1999, 82(7), 1470–1473.

Luzzi, D.E., et al., "Encapsulated C60 in Carbon Nanotubes", 1998, *Nature*, 323–324.

Ajayan, P.M., et al., "Opening carbon nanotubes with oxygen and implications for filing," *Nature*, 1993, 362, p. 522–1096.

Ajayan, P.M., et al., "Capillarity–induced filling of carbon nanotubes," *Nature*, 1993, 361, 333–334.

Ajayan, P.M., et al., "Carbon nanotubes as removable templates for metal oxide nanocomposites and nanostructures," *Nature*, 1995, 375, 564–567.

Ajayan, P.M., et al., "Growth morphologies during cobalt- –cataliyzed single–shell carbon nanotube synthesis," *Chem. Physics Ltrs.*, 1993, 215(3), 509–517.

Akasaka, T., et al., "$^{13}$C and $^{139}$La NMR studies of La$_2$@C$_{80}$: first evidence for circular motion of metal atoms in endohedral dimetallofullerenes," *Angew. Chem. Int. Ed. Engl.*, 1997, 36(15), 1643–1645.

Akasaka, T., et al., "Synthesis of the first adducts of the dimetallofullerenes La$_2$@C$_{80}$ and Sc$_2$@C$_{84}$ by addition of a disilirane," *Angew. Chem. Int. Ed. Engl.*, 1995, 34(19), 2139–2141.

Alvarez, M.M., et al., "La$_2$C$_{80}$ A soluble dimetallofullerene," *Phys. Chem.*, 1991, 95, 10561–10563.

Bethune, D.S., et al., "Cobalt–catalysed growth of carbon nanotubes with single–atomic–layer walls," *Nature*, 1993, 363, 605–606.

Burtcaux, B., et la., "Abundance of encapsulated C$_{60}$ in single–wall nanotubes," *Chem. Phys. Lett.*, 310, 1999, 21–24.

C&EN, Science/Technology, "Another nanotube surprise: Buckypeas in a pod," Jan. 11, 1999, p. 32.

Davis, J.J., et al., "The immobilisation of proteins in carbon nanotubes," *Inorganica Chimica Acta*, 1998, 272, 261–266.

Dujardin, E., et al., "Capillarity and wetting of carbon nanotubes," *Science*, 1994, 265, 1850–1852.

Eisberg, R., et al., Quantum Physics of Atoms, Molecules, Solids, Nuclei, and Particles, *Solids–conductors and Semiconductors*, John Wiley & Sons (Eds.), New York, 1985, Chapter 13, p. 444.

Heiney, P.A., "Structure, dynamics and ordering transition of solid C$_{60}$," *J. Phys. Chem. Solids*, 1992, 53(11), 1333–1352.

Hino, S., et al., "Photoelectron spectra of metallofullerenes, GdC$_{82}$ and La$_2$C$_{80}$: electron transfer from the metal to the cage," *Chem. Phys. Lett.*, 1997, 281, 115–122.

Iijima, S., et al., "Single–shell carbon nanotubes of 1–nm diameter," *Nature*, 1993, 363, 603–604.

Iijima, S., "Helical microtubules of granphitic carbon," *Nature*, 1991, 354, 56–58.

Journet, C., et al., "Large–scale productin of single–walled carbon nanotubes by the electric–arc technique," *Nature*, 1997, 388, 756–758.

Kobayashi, K., et al., "A theoretical study of C$_{80}$ and La$_2$@C$_{80}$," *Chem. Phys. Lett.*, 1995, 245, 230–236.

Kobayashi, K., et al., "endohedral dimetallofullerenes Sc$_2$@C$_{84}$ and La$_2$@C$_{80}$. Are the metal atoms still inside the fullerene cages?," *Chem. Phys. Lett.*, 1996, 261, 502–506.

Liu, J., et al., "Fullerene pipes," *Science*, 1998, 280, 1253–1256.

Matthews, C.K., et al., "Vaporization studies of buckminsterfullerene," *J. Phys. Chem.*, 1992, 96, p. 3566–3568.

(List continued on next page.)

Primary Examiner—Leo B. Tentoni
(74) Attorney, Agent, or Firm—Woodcock Washburn LLP

(57) ABSTRACT

A hybrid material is provided which comprises a first single-walled nanotube having a lumen, and a fill molecule contained within the lumen of the single-walled nanotube. A method for producing the hybrid material is also provided wherein a single-walled nanotube is contacted with a fill molecule to cause the fill molecule to enter the lumen of the single-walled nanotube.

5 Claims, No Drawings

OTHER PUBLICATIONS

Nakao, K., et al., "Ab initio molecular–orbital calculation for $C_{70}$ and seven isomers of $C_{80}$," *Physical Review B,* 1994, 49(16), 11 415–11 420.

Nikolaev, P., et al., "Diameter doubling of single–wall nanotubes," *Chem. Phys. Lett.,* 1997, 266, 422–426.

Rao, A.M., et al., "Photoinduced polymerization of solid $C_{60}$ films," *Science,* 1993, 259, 955–957.

Rinzler, A.G., et al., "Large scale purification of single wall carbon nanotubes: process, product and characterization," *Appl. Phys. A,* 1998, 67, 29–37.

Saito, S., et al., "Design of carbon–nanotube based materials," *Paper presented at Nanotubes 99,* East Lansing, MI, USA, 1999, 4 pages.

Sato, W., et al., "Molecular and intramolecular dynamics of a $C_{80}$ dimetallofullerene," *Phys. Rev. B,* 1998, 58(16), 10 850–10 856.

Sloan, J., et al., "the size distribution, imaging and obstructing properties of $C_{60}$ and higher fullerenes formed within arc–grown single walled carbon nanotubes," *Chem. Phys. Lett.,* 2000, 316, 191–198.

Sloan, J., et al., "Selective deposition of $UCl_4$ and $(KCl)_x(UCl4)_y$ inside carbon nanotubes using eutectic and noneutectic mixtures of $UCl_4$ and KCl," *J. Solid State Chem.,* 1998, 140, 83–90.

Smith, B.W., et al., "Formation mechanism of fullerene peapods and coaxial tubes: a path to large scale synthesis," *Chem. Phys. Lett.,* 2000, 321, 169–174.

Smith, B.W., et al., "Carbon nanotube encapsulated fullerenes: a unique class of hybrid materials," *Chem. Phys. Lett.,* 1999, 315, 31–36.

Smith, B.W., et al., "Encapsulated $C_{60}$ in carbon nanotubes," *Nature,* 1998, 396, 323–324.

Suzuki, T., et al., "Electrochemistry and Ab initio study of the dimetallofullerene $La_2@C_{80}$," *Angew. Chem. Int. Ed. Engl.,* 1995, 34(10), 1094–1096.

Thess, A., et al., "Crystalline ropes of metallic carbon nanotubes," *Science,* 1996, 273, 483–487.

Tsang, S.C., et al., "Thining and opening of carbon nanotubes by oxidation using carbon dioxide," *Nature,* 1993, 362(8), p. 520–521.

Tsang, S.C., et al., "A simple chemical method of opening and filling carbon nanotubes," *Nature,* 1994, 372(10), 159–162.

Ugarte, D., et al., "Filling carbon nanotubes," *Appl. Phys. A,* 1998, 67, 101–105.

Wang, G.W., et al., "Synthesis and x–ray structure of dumbbell–shaped $C_{120}$," *Nature,* 1997, 387, 583–586.

Yao, N., et al., "Young's modulus of single–walled carbon nonotubes," *J. Appl. Phys.,* 1998, 84(4), 1939–1943.

Yeretzian, C., et al., "Collisional probes and possible structures of $La_2C_{80}$," *Chem. Phys. Lett.,* 1992, 196(3,4), 337–342.

Zhang, B.L., et al., "Tight–binding molecular–dynamics simulation of buckyball collisioas," *J. Phys. Chem.,* 1993, 97, p. 3134–3138.

Zhang, Y., et al., "Defects in arc–discharge–produced single-walled carbon nanotubes," *Philos. Mag. Lett.,* 1999, 79(7), 473–479.

Zhang, B.L., et al., "The geometry of large fullerene cages: $C_{72}$ to $C_{102}$," *J. Phys. Chem.,* 1993, 98(4), 3095–3102.

\* cited by examiner

HYBRID MATERIALS AND METHODS FOR PRODUCING THE SAME

This Application: claims benefit of U.S. provisional application Ser. No. 60/145,586 filed Jul. 26. 1999.

The U.S. Government has a paid-up license in this invention and the right in limited circumstances to require the patent owner to license others on reasonable terms as provided for by the terms of Grant No. DE-FC02-86ER45254 awarded by the U.S. Department of Energy and Grant No. DMR98-02560 awarded by the National Science Foundation.

FIELD OF THE INVENTION

The present invention relates to single-walled nanotubes and methods for producing the same. In particular, the present invention relates to single-walled nanotubes having filled or partially-filled lumens and to methods for producing the same.

BACKGROUND OF THE INVENTION

Since their discovery, single-walled carbon nanotubes (SWCNTs) have stimulated widespread scientific research due to their promising electronic and mechanical properties. Proven techniques for the production of SWCNTs include carbon arc-discharge evaporation (Iijima et al., "Single-shell carbon nanotubes of 1-nm diameter", NATURE, Vol. 363, pp. 603–604, Jun. 17, 1993; Ajayan et al., "Growth morphologies during cobalt-catalyzed single-shell carbon nanotube synthesis", Chem Phys. Lett., 215(5), pp. 509–517, Dec. 10, 1993; Bethune et al., "Cobalt-catalysed growth of carbon nanotubes with single-atomic-layer walls", NATURE, vol. 363, pp. 605–606, Jun. 17, 1993), pulsed laser vaporization (PLV) of graphite in the presence of certain metallic catalysts (Thess et al., "Crystalline Ropes of Metallic Carbon Nanotubes", SCIENCE, vol. 273, pp. 483–487, Jul. 26, 1996), and chemical vapor deposition.

The known methods for producing SWCNTs, however, are unable to produce high quality SWCNT material. Accordingly, the material is refluxed in nitric acid to destroy contaminants that are more easily oxidized than the SWCNTs and then filtered to yield a sheet of tangled nanotubes a fraction of a millimeter thick (i.e., bucky paper). The bucky paper is then vacuum annealed at 1100° C. to drive off $C_{60}$ molecules and other residual organic impurities.

SWCNTs, produced using a pulsed laser vaporization (PLV) process similar to the one described above, have been investigated using high resolution transmission electron microscopy (HRTEM). Since a carbon nanotube satisfies the weak phase object approximation, its image is a projection of the specimen potential onto a plane that lies normal to the electron beam. The image has maximum contrast where the beam encounters the most carbon atoms, which occurs where the electron beam is tangent to the graphene walls of the carbon nanotube. Indeed, when SWCNTs which are pulled away from the bulk bucky paper were examined using HRTEM, an image consisting of two dark parallel lines separated by about 1.4 nm was obtained. The fact that the space between the parallel lines was clear indicates that no material is present within the SWCNTs. Characterizations of purified PLV-produced nanotubes by X-ray diffraction and Raman spectroscopy confirm these results.

Presently, a SWCNT has the largest elastic modulus (i.e., stiffness) of any intrinsic material. Accordingly, SWCNTs have been used to form reinforced polymer-matrix composites which are useful as high strength, light weight materials. In general, the mechanical properties of the reinforced composites are improved by increasing the stiffness of the reinforcing fibers. As a result, there is a continued need for carbon fibers having even larger elastic modulii.

It has been shown that the stiffness of SWCNTs can be increased by filling it with certain small molecules. Like any other material, when a SWCNT is placed in tension, it undergoes a Poisson contraction that causes a reduction in diameter. By filling SWCNTs with a molecule having a small compressibility, such as $C_{60}$, the Poisson contraction is resisted and the elastic modulus is increased. This resistance to transverse deformation also indicates that SWCNTs containing $C_{60}$ should be less likely to debond from the surrounding matrix, minimizing the likelihood of fiber pull-out, a common failure mode in composites. Use of such filled SWCNTs as reinforcing fibers in polymer-matrix composites should therefore provide a means for improving upon the mechanical properties of polymer-matrix composites.

It has been shown that exterior adsorbates can change metallic SWCNTs into semiconducting SWCNTs, opening the possibility for all-carbon metal-semiconductor junctions at the nanometer length scale. Dopants intercalated in between nanotubes have also been shown to affect the tubes' electronic properties. However, the usefulness of exterior molecules to modify the intrinsic properties of nanotubes is limited by the fact that exterior molecules are accessible to chemical reaction and may be unstable in solvents, vacuum, or certain atmospheres. Interior molecules are hermetically sealed within the nanotube cores, with the nanotube itself forming a steric and kinetic barrier to reaction. It is expected that certain interior molecules, like exterior molecules, will modify the electronic properties of nanotubes. Therefore, it would be highly beneficial to provide a means for permanently modifying the electronic properties of nanotubes by filling to produce novel devices, interconnects, and other technologies.

Mass transport inside a nanotube has been demonstrated by the motion of encapsulated $C_{60}$ along the axis of the surrounding tube. By the encapsulation of molecules having a strong magnetic moment, one-dimensional, nanoscopic mass transport devices which can be driven by an applied magnetic field are possible. Since even strong magnetic fields are known to be bio-compatible, this has potential application in the targeted delivery of drug molecules by the field induced ejection of the molecules from the nanotube cavity into the target (i.e., a nano-syringe). Mass transport may also be driven by other means (e.g., by momentum transfer from a laser). In all cases, the nanotube can be utilized to direct the motion of molecules in a controlled manner and along specific pathways.

Nanotubes also show promise for use as chambers to produce or catalyze the production of molecular structures that could not be easily produced otherwise. For example, a nanotube can act to enhance a reaction rate by confining reactants in close proximity, and it can determine the reaction product by providing a steric constraint on its structural form. Despite its small diameter, a nanotube is sufficiently strong to be self supporting over distances that are large as compared to many molecules. The nanotube therefore provides a convenient means to stabilize individual molecules for high signal-to-noise ratio characterization, such as by electron beam techniques, without the interference from a substrate film.

In light of the foregoing, SWCNTs and other types of single-walled nanotubes (SWNTs) show promise as reinforcing fibers for polymer-matrix composites, novel electronic devices, and nanoscopic mass transport devices (including nanoscopic drug delivery systems). The use of nanotubes in such applications and others is dependent upon the ability to controllably modify the intrinsic (e.g., mechanical, electronic, and/or magnetic) properties of the SWNTs by manipulating their microstructure. A particularly promising means for altering the intrinsic properties of SWNTs and using SWNTs in novel ways involves the filling of nanotube cavities or lumens to produce hybrid molecular assemblies that can have novel functionality. Accordingly, there is a need for nanotubes containing small molecules within their interior lumens and methods for producing the same.

SUMMARY OF THE INVENTION

The present invention relates to single-walled nanotubes having filled or partially filled lumens and methods for producing the same. The single-walled nanotubes are filled or partially filled with molecular species that are expected to alter the microstructure of the single-walled nanotubes. As such, the intrinsic (e.g., mechanical, electronic, and/or magnetic) properties of the filled or partially filled nanotubes can be controllably modified making the filled or partially filled nanotubes useful as reinforcing fibers for polymer-matrix composites, novel electronic devices, and nanoscopic mass transport devices.

In one of its aspects, the present invention relates to a hybrid material comprising a single-walled nanotube and a fill molecule contained within a lumen of the nanotube.

In another of its aspects, the present invention relates to a bulk material comprising nanotubes. The nanotubes are characterized by the fact that at least about 5%, preferably at least about 50%, and more preferably at least about 80% of the nanotubes contain one or more fill molecules within their lumens. In one embodiment, the nanotubes are arranged as a sheet of nanotubes.

In yet another of its aspects, the present invention relates to a method for producing a hybrid material comprising a single-walled nanotube having a lumen and a fill molecule contained within the lumen of the single-walled nanotube. The method comprises the step of forming a precursor material. The precursor material comprises nanotubes produced using any of a variety of techniques, including carbon arc-discharge evaporation, chemical vapor deposition, and pulsed laser vaporization. The nanotubes are optionally purified or similarly treated. The precursor material is then contacted with a fill molecule to bring the precursor material in physical contact with, or close proximity to, the fill molecules. In one embodiment, the precursor material is contacted with the fill molecule under conditions of temperature, pressure, and time sufficient to allow one or more fill molecules to at least partially fill the lumens of the nanotubes. The precursor material is then optionally heat treated to further induce the fill molecules to enter the lumens of the SWNTs. In one embodiment, the precursor material is heat treated by annealing the precursor material at a temperature below about 1000° C., preferably below about 800° C., and most preferably below about 600° C.

Additional features and embodiments of the present invention will become apparent to those skilled in the art in view of the ensuing disclosure and appended claims.

DETAILED DESCRIPTION OF THE INVENTION

The present invention relates to a hybrid material comprising a single-walled nanotube (SWNT) having a lumen and a fill molecule contained within the lumen of the SWNT.

The SWNT is formed using any of a variety of techniques known in the art. For example, the SWNT can be formed using pulsed laser vaporization (PLV) as described, for example, in Rinzler et al., Appl. Phys. A 67, pp. 29–37 (1998), the disclosure of which is incorporated herein, in its entirety, by reference. Alternatively, the SWNT can be synthesized using chemical vapor deposition. In still another embodiment, the SWNT is formed using carbon arc-discharge evaporation as described, for example, in Iijima et al., "Single-shell carbon nanotubes of 1-nm diameter", NATURE, Vol. 363, pp. 603–604, (1993); Ajayan et al., "Growth morphologies during cobalt-catalyzed single-shell carbon nanotube synthesis",Chem Phys. Lett., 215(5), pp. 509–517, (1993); and Bethune et al., "Cobalt-catalysed growth of carbon nanotubes with single-atomic-layer walls", NATURE, vol. 363, pp. 605–606, (1993), the disclosures of which are all incorporated herein, in their entireties, by reference. Any of a variety of single-walled nanotubes are contemplated for use with the present invention, including without limitation single-walled carbon nanotubes and boron-nitride nanotubes.

The fill molecule that is contained within the SWNT can take a variety of forms. In one embodiment, the fill molecule comprises one or more $C_{60}$ molecules. Since $C_{60}$ molecules have a diameter of about 0.7 nm and a graphitic van Der Waals spacing of about 0.3 nm, the $C_{60}$ molecules fit within the lumen of a SWNT having a diameter of about 1.4 nm without significant distortion from its equilibrium configuration. When the SWNT contains more than one $C_{60}$, the structure resembles that of a peapod, where the SWNT is the "pod" and the $C_{60}$ molecules are the individual "peas."

In another embodiment, the fill molecule comprises one or more capsule shaped fullerenes in the form of a cylinder of carbon, preferably having 10n carbon atoms, wherein $n \geq 0$. Each capsule is optionally capped at one end, both ends, or neither end by hemispherical carbon "caps". The carbon cap is essentially one half of a $C_{60}$ molecule. Accordingly, when the capsule is capped on both ends, the fullerene contains 60+10n carbon atoms. Further, when the capsule is capped on both ends, the capsule can be described as a metastable form of a fullerene. It should be apparent that as n increases, the capsule approximates a single-walled carbon nanotube, such that the hybrid material approaches a co-axial tube (CAT) structure.

In still another embodiment, the fill molecule comprises one or more metallofullerenes. Metallofullernes are fullerenes containing any of a variety of chemical species, including one or more transition metal elements. For example, each fill molecule comprises two lanthinum atoms surrounded by, or endohedrally contained within, a $C_{80}$ cage ($La_2@C_{80}$).

The hybrid materials can be formed using a method in accordance with the present invention wherein the hybrid material is formed from a precursor material comprising one or more SWNTs. The SWNT is formed using any of a variety of techniques known in the art. For example, the SWNT can be formed using pulsed laser vaporization (PLV) , chemical vapor deposition, or carbon arc-discharge evaporation.

Once the SWNT has been formed, the SWNT is optionally purified or similarly treated. For example, an acid (e.g., nitric acid) treatment may be imposed to remove contaminants that are more easily oxidized than the SWNTs. The SWNTs are then optionally filtered to recover the solid.

The precursor material is then contacted with the fill molecules to bring the precursor material in physical contact with, or close proximity to, the fill molecules. In one embodiment, the precursor material is contacted with the fill molecules under conditions of temperature, pressure and time sufficient to allow one or more fill molecules to at least partially fill the lumens of the SWNTs. In another particular embodiment, the fill molecules are themselves by-products of the process used to form the SWNT. For example, when the SWNT is formed by PLV and the resulting material is acid treated, the fill molecules may appear as a residue on the outer surfaces of the SWNT.

Alternatively, solution and/or vapor based transport can be used to contact the SWNTs with the fill molecules. In the former case, a solvent (e.g., dimethyl formamide or toluene) is chosen to permit the molecules to wash over and come in contact with the nanotubes. In the latter case, the temperature and/or pressure is tuned to permit the molecules to enter the vapor phase. These steps may be performed under vacuum, in an inert or non-oxidizing environment, or in air. The mobile molecules then collide with the nanotubes and enter through openings in their walls, possibly assisted by diffusion along the nanotubes' exterior and interior surfaces.

The precursor material is then optionally heat treated to further induce the fill molecules to at least partially fill the lumens of the SWNTs. In one embodiment, the precursor material is annealed at a low temperature to produce the hybrid material. A minimum temperature of about 300° C., preferably about 325° C., and more preferably about 350° C. is achieved at a vacuum of about $3 \times 10^{-5}$ Pa to promote exterior fill molecules (e.g., $C_{60}$) to enter the tubes on a reasonable time scale. Additionally, the precursor material is annealed at a temperature below about 1000° C., preferably below about 800° C., and more preferably below about 600° C. Higher annealing temperatures limit the residence time of $C_{60}$ on a SWNT as well as heal the nanotubes' walls, thereby eliminating access to their interiors. Since formation is governed by both time and temperature, nanotube material is preferably soaked in, and not ramped through, this temperature window in order to produce filled SWNTs in abundance. The precursor material is annealed for a time sufficient to effectuate the production of the fill molecule within the lumen of the SWNT. For example, anneal times from about 1 hour to about 100 hours, and preferably from about 1 hour to about 24 hours, can be utilized.

The filled or partially filled SWNTs are optionally further treated to induce reactions between fill molecules within the lumens of the SWNTs. For example, when the SWNTs are filled or partially filled with fullerenes (e.g., $C_{60}$), heat treating the SWNTs at a temperature above about 1000° C., preferably above about 1100°, and more preferably above about 1200° C. causes the individual fullernes to coalesce to form extended fullerenes (e.g., capsules).

EXAMPLES

Small sections of nanotube material, which were torn away from a sheet of tangled SWCNTs (i.e., bucky paper) were investigated using transmission electron microscopy (TEM). The sections of nanotube material fixed inside a 3 mm slot grid to be placed inside a high resolution transmission electron microscope (HRTEM). At the tear, SWCNTs that are pulled away from the bulk are suitable for imaging. This preparation technique does not subject the specimen to any additional chemical or thermal processing.

Isolated SWCNTs were imaged in JEOL 4000EX and JEOL 2010F transmission electron microscopes at an accelerating voltage of 100 kV. Magnification was determined using polyaromatic carbon shells present in the specimen, whose lattice fringes have a well defined spacing of 0.34 nm.

The HRTEM image of a graphene is a projection of the specimen potential onto a plane oriented perpendicular to the electron beam. The image has maximum contrast where the beam encounters the most carbon atoms, which occurs where it is tangent to the molecule's graphene-like walls. Thus, the image of a SWCNT consists of two dark parallel lines whose separation is equal to the tube's diameter, and the image of a $C_{60}$ molecule is a circle 0.7 nm in diameter.

Examples 1 and 2

The nanotubes for Example 1 were prepared at Rice University in the manner described in A. G. Rinzler et al., Large-scale purification of single-wall carbon nanotubes: process, product, and characterization, Appl. Phys. A 67 (1998) 323. In particular, nanotubes were synthesized by the laser ablation of a graphitic target impregnated with 0.6 at% each Ni/Co catalyst. This raw nanotube "mat" or sheet was refluxed in $HNO_3$ for 48 hours, rinsed and neutralized, suspended in surfactant, and filtered to form a thin paper. The nanotubes for Example 2 were synthesized at the University of Monpellier by carbon arc (CA) discharge using 4.2/1.0 at% Ni/Y catalyst and then similarly purified. Such wet chemical etching is known to open the ends of nanotubes as well as attack their sidewalls.

A number of materials were examined by HRTEM in the as-synthesized condition, after acid purification, and after subsequent ex-situ or in-situ anneals under a vacuum of 20–40 $\mu$Pa at temperatures of 100–1200° C. Temperature was monitored continuously via thermocouples. During in-situ experiments, only a few minutes were required to ramp between temperatures due to the small mass of the heater.

Baking as-purified material in vacuo at 225° C. for about 63 hours produces a general cleaning of the nanotubes. After baking, the nanotubes were free of most impurities, although X-ray diffraction and TEM observation confirm the presence of $C_{60}$ crystallites. The walls of the nanotubes appear as dark parallel lines in the HRTEM images and are seen to have breaks and disclinations that are the result of acid attack. Several hundred tubes were observed at various locations and were found to be empty.

The nanotubes were then reannealed for 2 hours at 450° C. HRTEM images of the material showed that the walls of the tubes were partially healed. Many tubes, both isolated and comprising ropes, were seen to contain $C_{60}$ chains which appear as regularly spaced strings of 0.7 nm diameter circles ($C_{60}$ molecules) between two parallel lines separated by 1.4 nm (corresponding to the diameter of the surrounding nanotube).

The HRTEM images indicate that peapods are formed during the annealing treatment following acid purification. Without being limited by theory, it is believed that the peapods are formed when residual exterior $C_{60}$ arrives at nanotube ends or sidewall defects via surface diffusion and/or transport in the vapor phase. This phenomenon is demonstrated by the following experiment. A specimen was prepared from PLV material and subsequently cleaned by baking for 24 hours at 225° C. The temperature was then cycled in the range 225–375° C., equilibrating at 25° increments for observation. A sequence of HRTEM images was recorded at 350° C. with 15–30 seconds between images. The nanotubes, which were originally clean, were shown to have $C_{60}$ molecules adsorbed to their surface. The fullerenes adsorb to locations on the nanotubes for only transient times before vanishing so quickly such that the motion is undetectable to the eye. The occupied locations appear to be random. During exposure to the electron beam of the electron microscope, individual fullerenes are damaged and become fixed in position.

Mobility has been observed in situ only at furnace temperatures exceeding 325° C. At the microscope column vacuum of 40 μPa, the sublimation temperature of solid $C_{60}$ is reported to be approximately 375° C. The agreement of these temperatures suggests that $C_{60}$ is most likely to arrive at a nanotube via the vapor phase. At the sublimation temperature of solid $C_{60}$, it might be expected that $C_{60}$ molecules are more strongly bound to a SWCNT than to each other due to the greater number of carbon—carbon Van der Waals interactions in the former case. Thus once a fullerene arrives at a nanotube, surface diffusion to an open end or sidewall defect could occur. As the temperature is increased, the residence time of $C_{60}$ on the surface of the SWCNT- and thus the probability of that molecule entering the SWCNT- decreases. Once the $C_{60}$ molecules enter, the stabilizing Van der Waals coordination with the surrounding tube causes them to be retained inside. Self-assembly into chains subsequently occurs because the interior fullerenes are still mobile, thereby increasing each molecule's coordination even further.

A test of the mechanism of peapod formation was conducted using acid purified CA material, which is expected to have little exterior $C_{60}$ due to its comparatively high catalyst concentration. Two specimens were prepared from the as-received paper. The first served as a control, while a drop of $C_{60}$ suspended in dimethyl formamide was added to the second, which was then air dried. Preliminary TEM observation of both samples confirmed that the tubes were damaged with open ends, that peapods were absent, and that $C_{60}$ crystallites were sparse in the control sample and abundant in the experimental sample. Each was annealed for 1 hour at 400° C. Large numbers of peapods were found in the experimental sample. In the control sample, a very low concentration of peapods was found, consistent with the small amount of $C_{60}$ seen in the as-purified CA material. In general, no difference could be detected between the peapods produced in the PLV synthesized SWCNTs and those in the CA synthesized SWCNTs.

The positive correlation between the amount of exterior $C_{60}$ pre-annealing and the amount of interior $C_{60}$ post-annealing evidences that $C_{60}$ molecules enter the tubes during heat treatment. This is corroborated by the fact that large (about 3 nm) diameter tubes are observed to contain irregularly arranged clusters of $C_{60}$ near their ends. Encapsulated $C_{60}$ chains are expected in samples having a high exterior $C_{60}$ concentration, and intra-sample microsegregation is related to the initial distribution of $C_{60}$ throughout the bulk as well as to the time and temperature of heat treatment.

Example 3

The related co-axial tube (CAT) structures, consisting of nested 0.7 nm and 1.4 nm diameter tubes, were synthesized by high-temperature processing of $C_{60}$ chains. Consider that no CATs have been observed in nanotube samples annealed in situ at temperatures up to 900° C., while they were initially discovered in material that was annealed above 1100° C. We have investigated this by annealing a PLV sample ex situ for 2 hours at 450° C. in order to produce $C_{60}$ chains and subsequently holding the sample for 24 hours at 1200° C. After furnace cooling, the sample was examined in the microscope, where CATs were observed in lieu of interior $C_{60}$. Without being bound by theory, it is believed that at 1200° C., neighboring $C_{60}$ molecules have a reasonable probability of colliding with sufficient kinetic energy to cause them to coalesce within the time frame of the experiment. The surrounding SWCNT thus acts as a reaction container, ensuring a near-zero impact parameter and templating the fused product into a 0.7 nm diameter SWCNT.

Example 4

SWCNTs containing metallofullerenes were also prepared. Nanotube material was impregnated with $La_2@C_{80}$ by adding a drop of $La_2@C_{80}$ solution in toluene and $CS_2$ to a microgram-sized piece of acid purified, carbon arc prepared SWCNT paper (from P. Bernier, University of Montpellier, and P. Petit, CNRS). Acid purification is known to open the ends of nanotubes and introduce defects into their walls, providing access to their interior. After the toluene/$CS_2$ solvent was allowed to evaporate, the specimen was examined by HRTEM. The resulting image shows the deposition of objects having circular cross sections, which are presumably small aggregates of $La_2@C_{80}$ molecules. Substantially larger regions having obvious crystallinity were also observed in similarly prepared samples. The acid etched nanotubes were found to be empty. Energy dispersive spectroscopy (EDS) of the bulk confirmed the presence of La, which was not present in the CA material prior to impregnation.

The specimen was vacuum annealed in situ under about 20 μPa for 7 hours at 400° C. and then for an additional 10 hours at 600° C. Following this heat treatment, a large percentage of the SWCNTs were filled with close-packed chains of metallofullerenes. An image of such an assembly is a direct projection of the specimen potential. It is dark wherever the electron beam is most strongly scattered, which occurs at those locations having the greatest mass-thickness in the direction of the beam. The assembly appears as a row of circular features between two parallel lines, corresponding to where the beam is tangent to the walls of the fullerene cages and the surrounding nanotube, respectively.

It is seen that each fullerene contains two point scattering centers appearing as dark spots within the circular, projected images of the $C_{80}$ shells. These are not centered within the cages but instead are positioned in close proximity to the fullerenes' interior walls and are seen to move in a manner that is described below. This motion, the large size of the film grain relative to the image, and the point resolution of the microscope (0.19 nm) determine the accuracy of the measurement on the atomic positions. Nevertheless, the contrast signature is that of heavy single atoms. The observations evidence that the molecules contained by the SWCNT are metallofullerenes. Since it is known that the applied heat treatment does not produce metallofullerenes, these endohedral molecules are positively identified as the $La_2@C_{80}$ additive.

The projected images of the $C_{80}$ shells appear circular, suggesting a spheroidal symmetry. Of the three lowest energy $La_2@C_{80}$ isomers presented in Table 1, this observation is consistent only with isomer C ($D_{2h}$ having an $I_h$ cage). The alternative isomers in Table 1 (A and B) have oblong cages with aspect ratios of approximately 1.3–1.4. Due to the small size of the confining SWCNT, oblong $La_2@C_{80}$ would be expected to align with its long axis parallel to the tube axis. Such differences between major and minor diameters are well within the resolution of the experiment but are not detected. Thus, the experimental data corroborate prior calculations that the $D_{2h}$ $La_2@C_{80}$ structure (isomer C) is thermodynamically and kinetically favored.

TABLE 1

Isomers of $La_2@C_{80}$.

| Isomer | $C_{80}$ cage symmetry | $La_2@C_{80}$ symmetry (optimized geometry) | La—La separation | Shape of cage |
|---|---|---|---|---|
| A | $D_2$ | $D_2$ | 4.407 Å | Oblong |
| B | $D_{5d}(D_5)$ | $D_5$ | 3.881 Å | Oblong |
| C | $I_h$ | $D_{2h}$ | 3.655 Å | Spheroidal |

This spheroidal isomer having a diameter of about 0.8 nm has evidently entered the SWCNTs. However, measurements indicate that many of the filled SWCNTs have a diameter of about 1.4 nm. Since the energetically favored graphitic Van der Waals gap between the walls of the contained and surrounding molecules is nominally 0.34 nm, this requires (1) compression of the Van der Waals gap to accommodate an undistorted metallofullerene, (2) distortion of the metallofullerene to accommodate the favored separation, or (3) reduction of the expected Van der Waals gap due to electronic effects. In any case, the energy cost must be less than the energetic stability gained by encapsulation of the $La_2@C_{80}$.

The apparent separation of La atoms within the $C_{80}$ cages as measured from a TEM micrograph depends upon the alignment of the La-La axis with respect to the electron beam. A well separated pair oriented parallel to the beam would appear as a single scattering entity of atomic number 154 (twice the mass-thickness of a single La atom) due to the projection effect of the microscope. It is possible to place a lower bound on the maximum La-La separation by determining the largest separation seen in the data. A separation is measured by examining the intensity profile of the image along the La-La axis. Each profile contains two peaks corresponding to the La atoms. The reported separation is the distance between the centers of these peaks. Measured La-La separations range from 0–5 Å, with the latter value representing the lower bound. In this analysis, it must be ascertained that the scattering of the carbon atoms in the cage wall, when combined with the scattering of the La atom, does not produce an apparent shift in the position of the La atom. This was tested using multislice calculations of TEM images of $D_{2h}$ $La_2@C_{80}$ (isomer C) using the Cerius[2] suite of programs. An optimized structure was assumed, having La-La separation of 3.655 Å, with the electron beam directed perpendicular to the La-La axis. The La-La separation in the simulated image, as measured from the centers of the intensity maxima, was approximately 4.7 Å, indicating a 1 Å shift in apparent separation due to imaging artifacts. (Note that the simulation was performed on an isolated metallofullerene, and so the expected minor effect of the surrounding SWCNT has not been considered.) Since the largest empirical measurements exceed this artifact-corrected value, we conclude that the actual La-La separation in $La_2@C_{80}@SWCNT$ is larger than the theoretical separation in $La_2@C_{80}$.

Additionally, although the endohedral La atoms are mobile, they remain stable for transient moments such that they can be imaged during even about 0.8 second exposures. A tumbling motion is directly observed, with the atoms circuiting around the inside of the $C_{80}$ cage. A "ratcheting" behavior is observed where the atoms tumble in discrete jumps. Given the larger than expected La-La separation, it is possible that the SWCNT induces the La atoms to lie closer to the $C_{80}$ cage, thereby increasing the potential barrier for accessing certain endohedral sites and freezing out free rotation at room temperature. Such a large effect of the SWCNT on the behavior of the encapsulated molecule must by mirrored by an effect of the molecule on the SWCNT. In this way, it is possible that the functionality of the SWCNT has been modified by the encapsulate.

Those skilled in the art will appreciate that numerous changes and modifications may be made to the preferred embodiments of the invention and that such changes and modifications may be made without departing from the spirit of the invention. For example, the present invention contemplates the use of any of a variety of types of nanotubes, including boron-nitride nanotubes. It is therefore intended that the appended claims cover all equivalent variations as fall within the true scope and spirit of the invention.

What is claimed is:

1. A method for producing a hybrid material comprising a single-walled nanotube having a lumen and a fill molecule contained within the lumen of the single-walled nanotube, the method comprising the step of annealing the single-walled nanotube in the presence of the fill molecule to provide said hybrid material, wherein the fill molecule comprises a $C_{60}$ molecule.

2. The method of claim 1 wherein the fill molecule comprises a plurality of $C_{60}$ molecules.

3. The method of claim 1 wherein the fill molecule comprises a carbon-based capsule.

4. The method of claim 3 wherein the carbon-based capsule comprises a hemispherically-capped cylinder of carbon having 60+10n carbon atoms, wherein $n \geq 0$.

5. The method of claim 4 wherein the hemispherically-capped cylinder of carbon has a length greater than a long dimension of a $C_{70}$ molecule.

* * * * *